(12) United States Patent
Suzuki

(10) Patent No.: US 7,662,505 B2
(45) Date of Patent: Feb. 16, 2010

(54) POROUS ELECTRODE, AND ELECTROCHEMICAL ELEMENT MADE USING THE SAME

(75) Inventor: Masa-aki Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 900 days.

(21) Appl. No.: 10/879,759

(22) Filed: Jun. 30, 2004

(65) Prior Publication Data

US 2005/0014060 A1 Jan. 20, 2005

Related U.S. Application Data

(63) Continuation of application No. PCT/JP03/13979, filed on Oct. 31, 2003.

(30) Foreign Application Priority Data

Oct. 31, 2002 (JP) .............................. 2002-318192

(51) Int. Cl.
*H01M 4/86* (2006.01)
(52) U.S. Cl. .............................. 429/41; 429/30; 429/33
(58) Field of Classification Search .................. 429/27, 429/34, 38, 40, 42
See application file for complete search history.

(56) References Cited

U.S. PATENT DOCUMENTS

| | | | | |
|---|---|---|---|---|
| 6,165,633 A | * | 12/2000 | Negishi | ........................ 429/17 |
| 7,087,340 B2 | * | 8/2006 | Hinokuma et al. | ............ 429/44 |
| 7,101,643 B2 | * | 9/2006 | Kerr et al. | .................... 429/313 |
| 2004/0175568 A1 | * | 9/2004 | Takaguchi | ................... 428/402 |

FOREIGN PATENT DOCUMENTS

| | | |
|---|---|---|
| EP | 1 096 587 A1 | 5/2001 |
| JP | 7-48459 | 2/1995 |
| JP | 7-484859 A | 2/1995 |
| JP | 2000-228204 A | 8/2000 |
| JP | 2000-243404 A | 9/2000 |
| JP | 2002-11075 A | 4/2002 |
| JP | 2002-110175 A | 4/2002 |
| JP | 2002-170573 A | 6/2002 |
| JP | 2002-170578 A | 6/2002 |
| JP | 2003-282078 | 10/2003 |
| JP | 2003-282078 A | 10/2003 |
| JP | 2004-6266 | 1/2004 |
| JP | 2004-6266 A | 1/2004 |
| WO | WO 99/66578 A | 12/1999 |
| WO | WO 02/13295 A | 2/2002 |
| WO | WO 02/13295 A1 | 2/2002 |

* cited by examiner

*Primary Examiner*—Patrick Ryan
*Assistant Examiner*—Monique Wills
(74) *Attorney, Agent, or Firm*—McDermott Will & Emery LLP

(57) ABSTRACT

The primary object of the present invention is to provide an electrode with which an efficient electrode reaction will occur. The present invention relates to a porous electrode which is an electrode composed of a porous material having electron conductivity, wherein (1) the porous material comprises a three-dimensional skeleton, (2) a substance having one or more proton affinity groups is present on all or part of the three-dimensional skeleton surface, and (3) a catalyst for separating hydrogen into protons and electrons is further included, with the catalyst being supported on the substance.

15 Claims, 5 Drawing Sheets

POROUS ELECTRODE, AND ELECTROCHEMICAL ELEMENT MADE USING THE SAME

This application is a continuation under 111(a) of PCT/JP03/013979, filed on Oct. 31, 2003.

TECHNICAL FIELD

This invention relates to a porous electrode used in electrochemical elements for cells, capacitors, and so forth. In particular, the invention is directed to an electrochemical element such as a fuel cell, air cell, hydrolysis apparatus, gas sensor, contaminant gas removal apparatus, and so forth in which this porous electrode is used as a gas diffusion electrode together with a reaction gas and an electrolyte.

BACKGROUND ART

Growing concern about the global environment issue has led to advances in the conservation of resources and energy. Considerable progress has been made in the development of energy resources that can be used as renewable "clean" energy, and systems thereof. Fuel cell systems in which hydrogen serves as the energy source have a particularly wide range of applications, such as in alternative automobile engine technology, distributed power sources, and cogeneration technology.

The popularization of cellular telephones and other such personal information devices has advanced the development of large-capacity cells to power these devices. One promising technology in this field is fuel cells that make use of hydrogen, methanol, or other such fuel.

FIG. 3 shows the basic structure of a fuel cell. A fuel cell is made up of a fuel electrode for producing electrons and protons by reacting a fuel such as hydrogen, electrolyte for transmitting the produced protons, and an oxygen electrode for reacting electrons supplied through an external circuit with oxygen and protons.

The reactions in the electrodes of a fuel cell have the following roles, respectively.

As to the fuel electrode, a fluid fuel that is a liquid or gas reacts with a catalyst on the electrode, with this reaction comprising $H_2 \rightarrow 2H^+ + 2e^-$, for example. The resulting charge-separated electrons are transferred from the electrode to an external circuit, and protons are transferred to a proton-conductive electrolyte. The electrolyte serves to transmit just protons, and one whose efficiency is decreased only minimally by the diffusion of fuel, etc., is used.

As to the oxygen electrode located across from the fuel electrode, electrons and protons produced in the fuel electrode arrive and react with the oxygen in the air or with oxygen gas in the presence of a catalyst, and water is produced in a reaction comprising $O_2 + 4H^+ + 4e^- \rightarrow 2H_2O$.

The result of above reactions is that electrical power can be obtained from the energy of hydrogen, methanol, and other such renewable energy sources, and since the reaction product is water, there are no environmental problems.

As discussed above, the necessary components of an electrode used in a fuel cell are a fuel fluid (gas or liquid), a catalyst that serves as the reaction site where the reaction between electrons, protons, and fuel will occur, and an electrode material and an electrolyte for transporting the charge of the electrons or protons. It is thus important to create an environment affording the optimal coexistence of a charge conductor, a catalyst, and a space through which the fuel will flow. Particularly when the electrode is made using a fluoropolymer having sulfonic acid groups on its side chains, which is a proton-conductive solid electrolyte, as the electrolyte, it can be made by molding carbon particles or the like that support a catalyst, and coating the resulting conductive porous material with an electrolyte, or by embedding an electrode in this porous electrode (eg, WO96/508535 or Japanese Unexamined Patent Publication 2000-154273).

One known method for manufacturing a fuel cell comprises a step in which a fuel electrode and an oxygen electrode are produced, a flat electrode material supporting a platinum catalyst is pressed in a direction perpendicular to the plane of the electrode material, and the surfaces of the fuel electrode and the oxygen electrode are then impregnated by being coated with a fullerene derivative-based proton conductor (Japanese Unexamined Patent Publication 2002-110196, and especially paragraph [0031]).

DISCLOSURE OF THE INVENTION

In general, the electrodes of a fuel cell consist of a) a fuel gas, b) a catalyst used to promote the reaction, c) an electrode for transporting charges, and d) an electrolyte. Since the fuel here must reach the catalyst efficiently, a porous material is used as the electrode. For the efficient reaction, it is preferable for the catalyst to be in the form of microparticles and to be dispersed without aggregating, so that the specific surface area will be higher. In the reaction that produces protons, it is preferable if the fuel gas reacts with the catalyst, and if the electrons and protons thus produced are efficiently separated and transported from the catalyst (the reaction site). In the reaction that produces water from protons, it is preferable if the electrons and protons efficiently arrive at the catalyst (the reaction site) and react there with oxygen.

However, as shown in the conceptual diagram in FIG. 4, when the electrode is made up of carbon particles 101 such as carbon black, catalyst 102 and 103 are supported on these carbon particles 101, after which the carbon is coated with a polymer electrolyte 104 so that the carbon surface is covered with the polymer, or the catalyst is embedded in the polymer. Accordingly, in actual practice, as shown in FIG. 4, there are portions of the carbon electrode surface that are completely covered by the solid polymer electrolyte 104, and portions only partially covered, and in some cases there are also portions not covered at all.

For example, the reaction does not proceed efficiently in the portion entirely covered with the solid polymer electrolyte 104 because the fuel fluid has difficulty in reaching the catalyst. This means that less of the catalyst is being used effectively, so more of the expensive catalyst of platinum or the like is used than necessary, which drives up the cost.

On the other hand, the fuel fluid readily reaches the catalyst in those portions not covered with the electrolyte. Even though the protons and electrons produced in the reaction with the catalyst, there is no nearby polymer electrolyte 104 to convey the protons to the electrolytic film 105. The charge separation can not be kept, the electrons and protons bond again. Thus, the reaction can not be carried out efficiently. Accordingly, just as with the portions covered by the polymer electrolyte, expensive platinum or other catalyst ends up being used in a larger quantity than necessary, resulting in higher cost.

As discussed above, the reaction between the fuel, catalyst, and electrolyte did not necessarily proceed efficiently with a conventional electrode structure. Specifically, any catalyst that does not participate in the reaction results in a corresponding increase in the amount of catalyst used, which is a problem in that the cost cannot be reduced.

Also, if the electrode is composed of carbon particles such as carbon black, the problem of catalyst agglomeration is encountered in the step in which the catalyst is supported on the carbon particles, in the step in which the particles are combined with the polymer electrolyte, or another such step. If the catalyst agglomerates, its specific surface area decreases and reaction efficiency drops off, which means that more catalyst has to be used.

Meanwhile, Japanese Unexamined Patent Publication 2002-110196 discloses a method for manufacturing a fuel cell in which an electrode supporting a platinum catalyst is formed and then impregnated with a fullerene derivative-based proton conductor. Specifically, most of the catalyst contained in the molded electrode is isolated from the fullerene derivative-based proton conductor. Accordingly, even though protons are produced on the catalyst, if no fullerene derivative-based proton conductor is present there, the protons will just bond with electrons again. This manufacturing method requires further improvement in this respect.

The present invention was conceived in light of the problems encountered with prior art, and provides an electrode with which the reaction proceeds more efficiently. It is a further object of the present invention to provide an electrochemical element such as a fuel cell with which the reaction will proceed more efficiently.

The present invention relates to a porous electrode and electrochemical element as follows.

1. A porous electrode comprising a porous material having electron conductivity, wherein (1) the porous material is composed of a three-dimensional skeleton, (2) a substance having one or more types of proton affinity group is present on all or part of the three-dimensional skeleton surface, and (3) a catalyst for separating hydrogen into protons and electrons is further included in the electrode, with the catalyst being supported on the substance having the proton affinity group(s).

2. The porous electrode according to 1 above, wherein substantially all of said catalyst is supported on the substance having the proton affinity group(s).

3. The porous electrode according to 1 above, wherein the substance is a linear molecule, at one end of this linear molecule there is one or more groups with high affinity to the porous material, and at the other end there is the proton affinity group(s), and the groups of a plurality of the linear molecules are adsorbed to the surface of the porous material, and the proton affinity group(s) of a plurality of the linear molecules form a surface with proton affinity.

4. The porous electrode according to 1 above, wherein the substance is a spherical molecule having one or more proton affinity groups.

5. The porous electrode according to 4 above, wherein the spherical molecule is at least one selected from a dendrimer and a fullerene.

6. The porous electrode according to 4, wherein the spherical molecule is a dendrimer.

7. The porous electrode according to 1 above, wherein the porous material is a carbon material.

8. The porous electrode according to 1 above, obtained by impregnating a porous material with a solution or dispersion containing a substance that has one or more proton affinity groups and supports a catalyst.

9. The porous electrode according to 1 above, wherein the porosity of the porous material is at least 20% and not more than 80%.

10. The porous electrode according to 1 above, wherein the specific surface area of the porous material is at least $10\,m^2/g$ and not more than $500\,m^2/g$.

11. A method for manufacturing a porous electrode comprising a porous material having electron conductivity, wherein the porous material comprises a three-dimensional skeleton, a substance having one or more proton affinity groups is present on all or part of the three-dimensional skeleton surface, a catalyst for separating hydrogen into protons and electrons is further included in the electrode, with the catalyst being supported on the substance having a proton affinity group(s), comprising a step of impregnating a porous material with a solution or dispersion containing a substance that has one or more proton affinity groups and supports a catalyst.

12. An electrochemical element in which a fuel electrode that produces protons from a fuel and an oxygen electrode that reacts protons with oxygen, wherein the fuel electrode and the oxygen electrode are disposed across from each other with a proton-conductive solid electrolyte in between, and wherein at least one of the electrodes is the porous electrode according to 1 above.

13. The electrochemical element according to 12 above, wherein the fuel is hydrogen.

14. The electrochemical element according to 13 above, wherein the fuel is methanol.

Figure 1:
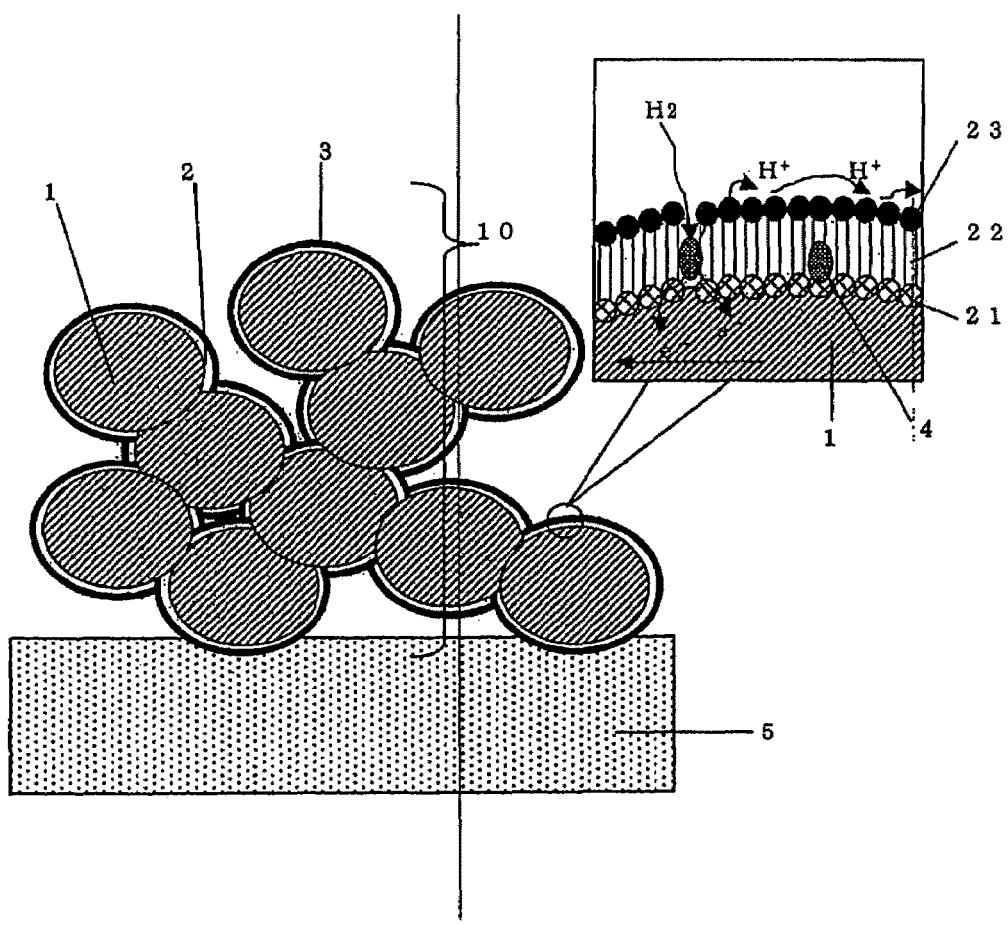
FIG. 1 is a diagram illustrating an example of the porous electrode of the present invention.

KEY 1 porous material having electron conductivity
2 spacer
3 surface having proton affinity
4 catalyst
5 proton-conductive solid electrolyte
10 porous electrode
21 portion of spacer with affinity to porous material
22 chain monomolecular portion of spacer
23 portion of spacer with affinity to proton affinity groups
30 spherical molecule spacer
31 surface of porous material having electron conductivity
32 surface of proton affinity group
33 spacer
34 catalyst
321 proton affinity group portion of spherical polymer (dendrimer)
331 spacer of spherical polymer (dendrimer)
351 portion of spherical polymer (dendrimer) with affinity to porous material
322 spherical carbon (carbon 60) spacer
332 proton affinity group portion of spherical carbon (carbon 60)

101 particles of porous material having electron conductivity
102 active catalyst
103 inert catalyst
104 coated proton-conductive solid electrolyte
105 proton-conductive solid electrolyte film
300 filled portion of spherical molecules having proton affinity groups on their surface

BEST MODE FOR CARRYING OUT THE INVENTION

Embodiments of the present invention will now be described.

1. Porous Electrode

The porous electrode of the present invention is an electrode comprising a porous material having electron conductivity, wherein (1) the porous material comprises a three-dimensional skeleton, (2) a substance having one or more proton affinity groups is present on all or part of the three-dimensional skeleton surface, and (3) a catalyst for separating hydrogen into protons and electrons is further included, with the catalyst being supported on the substance.

(a) Porous Material

There are no restrictions on the porous material as long as it has electron conductivity. In other words, it may be one that will transmit electrons or holes, such as a metal material, an oxide conductor, a semiconductor, a conductive polymer, a carbon material, and other such conductive materials, which can be used singly or in combinations of two or more types.

Specific examples of metal materials include gold, platinum, nickel, iron, zinc, aluminum, and stainless steel. Examples of oxide conductors include titanium oxide, tin oxide, indium oxide, indium tin oxide, tungsten oxide, tantalum oxide, and vanadium oxide. Examples of semiconductors include silicon, cadmium sulfide, zinc sulfide, and zinc selenide. Examples of conductive polymers include polypyrrole, polyaniline, and polythiophene, as well as derivatives of these. Examples of carbon materials include carbon black (such as acetylene black and ketjen black), activated carbon, artificial graphite, natural graphite, carbon fiber, pyrolytic carbon, vitreous carbon, impermeable carbon, special carbon, coke, and the like. Nor are there any restrictions on the crystal structure, which may comprise a diamond structure, graphite structure, etc. Carbon nanomaterials such as carbon nanotubes, carbon nanohorns, carbon nanoribbons, carbon nanocoils, carbon nanocapsules, and the like can also be used as the carbon material.

A composite material that combines a conductive material with a non-conductive material can also be used. Examples of this include a material obtained by forming a metal film by plating or another such method on the surface of a porous material such as silica or alumina, and a material obtained by covering surface of a porous material such as silica or alumina with an oxide conductor, a conductive polymer, or the like.

Of these various materials, the use of a carbon material is particularly favorable with the present invention. Using a carbon material allows the catalyst to be supported at a high specific surface area and affords good resistance to acids or alkalies. Furthermore, workability and moldability are good and the cost is low.

The structure of a porous material consists of a three-dimensional skeleton. There are no particular restrictions on the three-dimensional skeleton as long as it has the desired porosity. The porosity of the porous material can be suitably determined according to the intended application of the porous material, its method of use, and other factors, but is generally between 10% and 98%. When the efficiency of the electrode reaction of the reaction substances supplied in the form of a liquid or gas, and the strength of the electrodes are taken into account, a range of 20% to 80% is preferred. There are no limitations on the specific surface area (BET method), but it usually can be suitably set between 5 $m^2/g$ and 2000 $m^2/g$, and when electrode reaction efficiency and electrode strength are taken into account, a range of 10 $m^2/g$ to 500 $m^2/g$ is preferred.

The porous material can be also manufactured by any known method, as long as it allows a three-dimensional skeleton to be formed. For example, raw materials in a variety of forms, such as a powder, granules, or fibers, can be formed into the required shape by a standard forming method such as pressing, injection molding, foam molding, printing or coating. These methods yield a three-dimensional skeleton such as a porous structure formed by the agglomeration of powder particles, a cellular structure obtained by foaming, or an intertwined structure obtained by the intertwining of fibers. All of these can be used as the porous material of the present invention.

It is also possible to manufacture the porous material by a method in which the above-mentioned material is rendered porous simultaneously with its synthesis. For instance, a sol-gel method can be used to advantage. A dry gel obtained from a wet gel produced by sol-gel method is favorable because it has a reticulated skeleton structure and a large specific surface area. Examples include a dry gel obtained by drying a wet gel of an oxide conductor such as titanium oxide or vanadium oxide, and a porous carbon material obtained by firing a carbon precursor dry gel.

(b) Substance Having Proton Affinity Group

According to the porous electrode of the present invention, a substance having one or more proton affinity groups (hereinafter also referred to as a "spacer") is present on all or part of the three-dimensional skeleton surface. The main purpose of this spacer is to isolate the produced protons from the electrons, that is, to isolate the protons from conductive materials that transmit electrons.

The spacer may consist of molecules having one or more proton affinity groups. There are no limitations on the shape of these molecules, but linear molecules, spherical molecules, and so forth can be used to particular advantage.

Regarding a linear molecule, a monomolecular structure is preferable, examples of which include a) chemical adsorption molecules whose affinity to the porous material is the result of a chemical reaction, and b) amphipatic molecules used in monomolecular films, bimolecular films, and so forth whose affinity is the result of physical adsorption. Examples of spherical molecules include dendrimers (such as polyamide-amine dendrimers and polypropyleneimine dendrimers) and fullerenes (such as $C_{60}$, $C_{70}$, $C_{76}$, $C_{78}$, $C_{82}$, and $C_{84}$). The use of a dendrimer is preferred in the present invention, the reasons for which will be discussed below.

Examples of proton affinity groups include a sulfonic acid group, hydroxyl group, carboxylic acid group, amine group, amino group, ammonium group, amide group, thiol group, silanol group, phosphoric acid group, and oxyethylene group. One or more of these proton affinity groups may be included in the molecule. If two or more proton affinity groups are included, they may be the same as or different from each other. These proton affinity groups can be appropriately selected according to the type of porous material and other factors.

As for the specific spacer to be used, when a linear molecule is used as the molecule that makes up the above-mentioned substance, a compound in which there is one or more proton affinity groups at one end of a linear molecule (chain molecule) composed of an alkylene group, phenylene group, or the like, and there is the functional group with high affinity to the porous material surface at the other end, can be used favorably. The functional group with high affinity to the porous material surface can be appropriately selected according to the properties of the porous material surface. For instance, this functional group can be 1) an alkyl group, fluoroalkyl group, phenyl group, or the like when the surface is highly hydrophobic, 2) a halogeno silyl group, alkoxysilyl group, or other such silane coupling group when there are hydroxyl groups, such as with an oxide or carbon that has been rendered hydrophilic, or 3) a disulfide group, thiol group, 1,3,5-triazine-2,4-dithiol group, amino group, or other such selective adsorption group that readily forms a complex, when the porous material is a metal material such as gold, copper, or platinum. These groups are used so that the above-mentioned substance will be present on the porous material surface. In order to improve strength, the above-mentioned substance may be polymerized on the porous material surface using a molecule having a polymerizable functional group.

When a spherical molecule is used as the spacer, it is preferable for the proton affinity groups to be introduced at the spherical molecule surface (and particularly the outer peripheral portion). At least one of a dendrimer and a fullerene can be used to advantage as the spherical molecule. As discussed below, a dendrimer is most favorable because it affords better design freedom according to the size of the catalyst (particles), and because the catalyst can be fixed in the interior of the spherical molecule.

These spherical molecules generally line up readily on the surface through physical adsorption because of their characteristic of being self-aligning.

A molecule having the proton affinity group that is a functional group at a terminal or bond from which successive dendritic polymerization can proceed can be used favorably as the dendrimer. A molecule in which one or more proton affinity groups have been further provided to a functional group can also be used. A dendrimer is a multi-branched spherical polymer produced by the regular dendritic growth of a polymer. Its molecular structure consists of the elements of a core, a branching skeleton, and outermost groups. The branching skeleton can be successively formed from the core that serves as the nucleus by polymerization. A dendrimer can be grown in stages depending on the number of polymerization iterations. Selecting the molecule to be grown and other factors allows for precise control of the structure and size of the dendrimer. When a catalyst is formed in the interior, the size of this catalyst can also be regularly controlled.

As to the type of dendrimer, it can be based on a polyamide-amine, polypropyleneimine, polyether, or other aliphatic or aromatic polymer. The size thereof can be controlled by the amount of growth, but is roughly 1 nm to 100 nm. When a nanometer-size catalyst with high catalytic activity is formed in the interior, the size may not be too large, and a range of roughly 1 nm to 50 nm is preferable.

In addition to a hydroxylated fullerene, a fullerene that has been surface-modified with a strong proton affinity group, such as a sulfonic acid group or carboxylic acid group, can be used as the fullerene. It is also possible to use one of these fullerenes in which a metal that acts as a catalyst is included in the interior of the molecule.

These spacers can be known or commercially available products. Those obtained by a known synthesis method can also be used. One in which one or more proton affinity groups have been imparted to a known molecule (particularly a linear molecule or spherical molecule) can also be used.

In the porous electrode of the present invention, the spacer may be present over all or part of the three-dimensional skeleton surface. The amount (proportion) of spacer can be suitably adjusted as dictated by the intended application of the porous material, its method of use, and other factors. In particular, it is preferable that the spacer is present so as to cover substantially entirely three-dimensional skeleton. The efficient electrode performance can be obtained thereby.

There are no particular restrictions on how the spacer is imparted to the porous material. For instance, a spacer can be favorably imparted by immersing a porous material in a solution or dispersion in which the spacer has been dissolved or dispersed in a solvent. In this case, the above-mentioned solvent can be water or an organic solvent. The organic solvent can be methanol, ethanol, and or another such alcohol, hexane or another such hydrocarbon, or the like. The amount in which the spacer is used in this case may be appropriately determined according to the type of porous material being used and other factors.

(c) Catalyst

The porous electrode of the present invention includes a catalyst that separates hydrogen into protons and electrons. It is preferable for the catalyst included in the porous electrode to be supported on the spacer, and it is even more preferable for substantially all of the catalyst to be supported on the spacer. This makes it possible to obtain better electrode characteristics with a smaller amount of catalyst. The catalyst may also be present at portions other than the spacer so long as this does not adversely affect the performance of the present invention.

The catalyst can be appropriately selected from among standard catalysts (substances with catalytic activity) used, for example, in electrode reactions for separating hydrogen into protons and electrons. For instance, when the porous electrode is used in a fuel cell or the like, the catalyst can be platinum, palladium, ruthenium, gold, or another such metal, platinum-ruthenium, platinum-iron, or other such alloy, or an oxide of nickel, manganese, or the like. These can be used singly or in combinations of two or more types.

Imparting the catalyst can be accomplished by a known method. Examples include a) a method in which the catalyst is supported using a colloid, b) a method in which reduction is performed after a metal salt or other precursor is supported, and c) a method in which a metal salt or other precursor is fired.

The catalyst may be imparted at any stage of the process. Examples of methods that can be employed include a) imparting the catalyst to the porous material surface in the course of forming the porous electrode, b) simultaneously introducing the catalyst in the course of imparting the spacer to the porous material surface, c) supporting the catalyst on the spacer in advance, and then imparting this spacer to the porous material surface, and d) imparting the spacer and then imparting the catalyst to the porous material surface. The appropriate method can be selected according to the materials being used, the electrode structure, and other such factors.

The above method c) is preferred with the present invention. This allows substantially all of the catalyst that is used to be supported on the spacer, which makes the catalyst reaction proceed more efficiently. In specific terms, the electrode of the present invention can be favorably manufactured by impregnating the porous material with a solution or dispersion containing a spacer that supports a catalyst. This can be accomplished by following the method for imparting a spacer as described above. In the above case, a spacer that does not support a catalyst may also be used together with the spacer supporting a catalyst.

As discussed above, the porous electrode of the present invention can consist primarily of a porous material having electron conductivity, a spacer, and a catalyst. The spacer is formed on the surface of the three-dimensional skeleton that makes up the porous material. The reaction produced by the catalyst can be made particularly efficient by having the catalyst be supported on the spacer. Specifically, there is a space near the catalyst that makes it easier for the reactants to reach the catalyst at the reaction site. Furthermore, since a conductor that conducts the electronic charge pertaining to the catalyst reaction and a conductor that conducts protons are present near the catalyst at the reaction site, it is easier to separate charged bodies from the catalyst or to supply charged bodies to the catalyst.

As for the location where the catalyst is present, more excellent effect can be obtained when the catalyst is present between the surface of the porous material and the proton affinity groups of the spacer that cover the porous material, so that the catalyst will be close to the charge conductors of each. It is preferable if substantially all of the catalyst is supported on the spacer in order to fix the catalyst location.

If the spacer forms a monomolecular layer, the length of the spacer will be on the molecular order, and electrons will be transmitted by tunnel conduction or hopping conduction from the catalyst to the electrode material, or from the electrode material to the catalyst. Protons are conducted to the proton affinity groups, pass through the surface by hopping conduction, and reach the electrolyte, or, conversely, the protons are conducted to the catalyst. If this length is too great, it will be difficult to make the passage between the catalyst and the conductor, and efficiency may suffer. The thickness of the monomolecular layer is preferably between 0.1 nm and 100 nm so that the electrons and protons will be conducted efficiently as discussed above. When the tunneling conductivity of electrons is factored in, it is particularly favorable for the distance to be from 0.5 nm to 20 nm. The optimal size range can be determined according to the size of the molecules or catalyst, etc.

If the thickness is within the above range, because of the good diffusability of the hydrogen serving as the fuel, the hydrogen will reach the catalyst and the reaction will proceed even though the catalyst is covered with a substance having a proton affinity group.

2. Electrochemical Element

The electrochemical element of the present invention comprises a fuel electrode that produces protons from a fuel and an oxygen electrode that reacts protons with oxygen, wherein the fuel electrode and the oxygen electrode are disposed across from each other with a proton-conductive solid electrolyte in between, and wherein at least one of the electrodes is the porous electrode of the present invention.

Except for using the porous electrode of the present invention as an electrode, any constituent elements (electrolyte, container, separator, etc.) of a known electrochemical element (fuel cell) can be used.

The solid electrolyte used in producing the electrochemical element of the present invention can be an electrolytic material capable of conducting protons. For instance, a fluorine-based polymer film having sulfonic acid groups on side chains; a hydrated oxide such as tungsten oxide or molybdenum oxide; a solid acid complex such as a polyphosphoric acid or polytungstic acid; or the like can be used favorably.

The electrolyte is preferably formed into a film or sheet. To combine the porous electrode with an electrolyte, it may be affixed to the electrolyte or applied by a printing or coating process.

When this electrochemical element is used as a fuel cell, the fuel thereof can be hydrogen or a fuel based on an alcohol such as methanol or ethanol, a fuel based on an ether such as dimethyl ether or diethyl ether, or a fuel based on a hydrocarbon such as methane, ethane, propane, or butane, or can be gasoline or the like. Of these, hydrogen can be used to particularly good advantage.

These fuels may be used directly in a reaction at the porous electrode, or may be reformed to generate hydrogen in advance, and then used in the reaction. Particularly in the case of using directly in the reaction at the porous electrode, methanol is preferable for an electrochemical element consisting of a fuel cell because of its high reaction efficiency in generating hydrogen.

A number of variations are possible for the porous electrode and electrochemical element pertaining to the present invention, typical embodiments of which will now be described.

(1) EMBODIMENT 1

FIG. 1 illustrates an example of an embodiment of the porous electrode of the present invention.

The porous electrode 10 of the present invention consists of a porous material 1 having electron conductivity and composed of conductive particles. A surface 3 with proton affinity attributable to proton affinity groups 23 is formed on the porous material, via a spacer 2. This spacer 2 is adsorbed to the porous material 1 at a portion 21 (affinity portion) with high affinity to the porous material, and a catalyst 4 in the form of microparticles is contained within this chain monomolecule 22.

Figure 3:
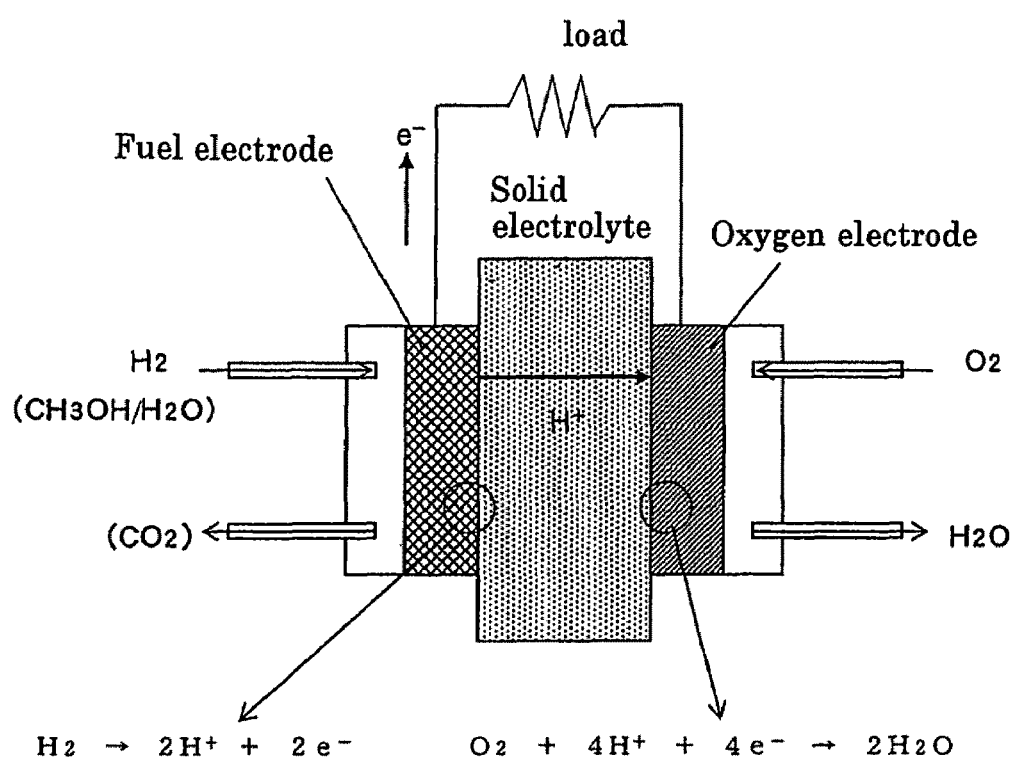
FIG. 3 is a diagram illustrating the general principle of a fuel cell.
Figure 4:
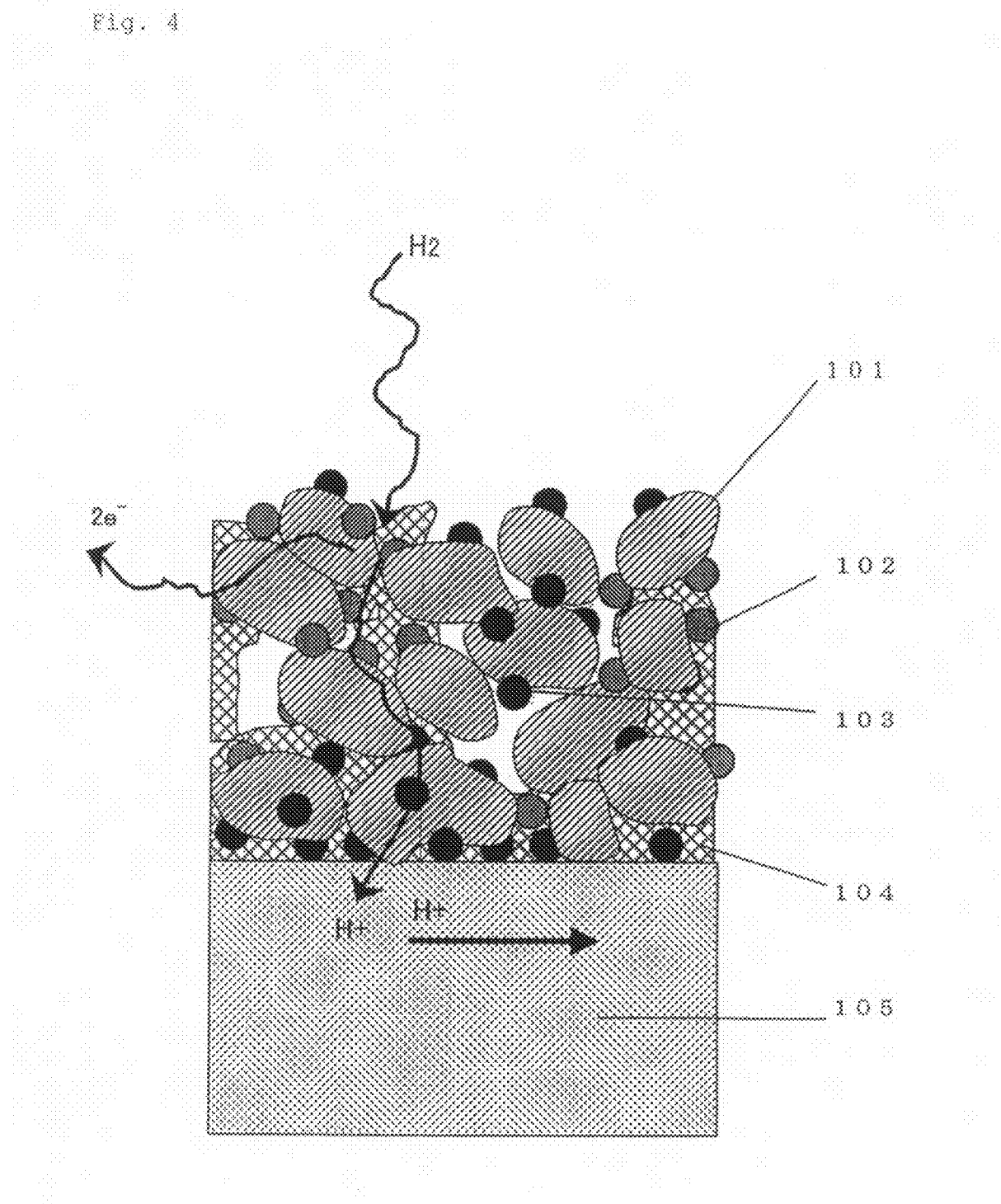
FIG. 4 is a diagram illustrating a conventional porous electrode.

When this porous electrode is used as an electrochemical element, as shown in the example of a fuel cell in FIG. 3, the porous electrodes 10 can be disposed across from each other with a proton-conductive solid electrolyte 5 in between, the electrodes can be connected to an external circuit, and a fuel can be supplied to the electrodes. The catalyst 4 used in the porous electrode 10 can be selected so as to be suited to the reaction produced at the various electrode portions.

In an example of a fuel cell in which hydrogen is used as the fuel, the reaction that occurs at the fuel electrode will be described through reference to FIG. 1. The hydrogen diffuses into the voids of the porous material 1 of the porous electrode 10 and reaches the surface thereof. The hydrogen can easily reached the catalyst 4 at the surface covered by the spacer 2. Upon reaching the catalyst 4, the hydrogen reacts and gives electrons ($e^-$) and protons ($H^+$).

The electrons pass from the location of the catalyst 4 to the porous material 1 having electron conductivity, and from there are supplied to an external circuit. The length of the spacer 22 forming the monomolecular layer is sufficient to allow the electrons to be conveyed instantaneously to the porous material 1 by a tunneling conduction mechanism, so the separation of electrons and protons can proceed efficiently.

Meanwhile, the protons are readily conveyed by a hopping conduction mechanism from the catalyst 4 to the proton affinity groups 23. On the surface 3, the protons are moved by the hopping conduction mechanism and reach the electrolyte 5. They are then conveyed to the electrode across from the electrolyte 5, where they react with oxygen.

(2) EMBODIMENT 2

The another structure of the surface 31 portion of the porous material having electron conductivity in the porous electrode of the present invention will be described through reference to FIG. 2.

In contrast with the structure consisted of an organic layer of chain molecules in Embodiment 1, the same advantages can be obtained with a spacer 30 of spherical molecules as in Embodiment 2. The spacer 30 of spherical molecules is composed of a spacer component 33 and a proton affinity group component 32. The microparticles of a catalyst 34 are disposed inside the organic layer or between the spherical molecules.

A dendrimer of spherical molecules produced by the dendritic growth of a polymer, as well as spherical carbon such as carbon 60 and carbon 70, are preferable as these spherical molecules. These spherical molecules are suited to the object of the present invention because they facilitate the introduction of proton affinity groups or groups with affinity to the porous material at the surface. The microparticles of the catalyst 34 can be formed inside the spherical molecules, or can be formed in the spaces where spherical molecules are in contact with each other.

Figure 2:
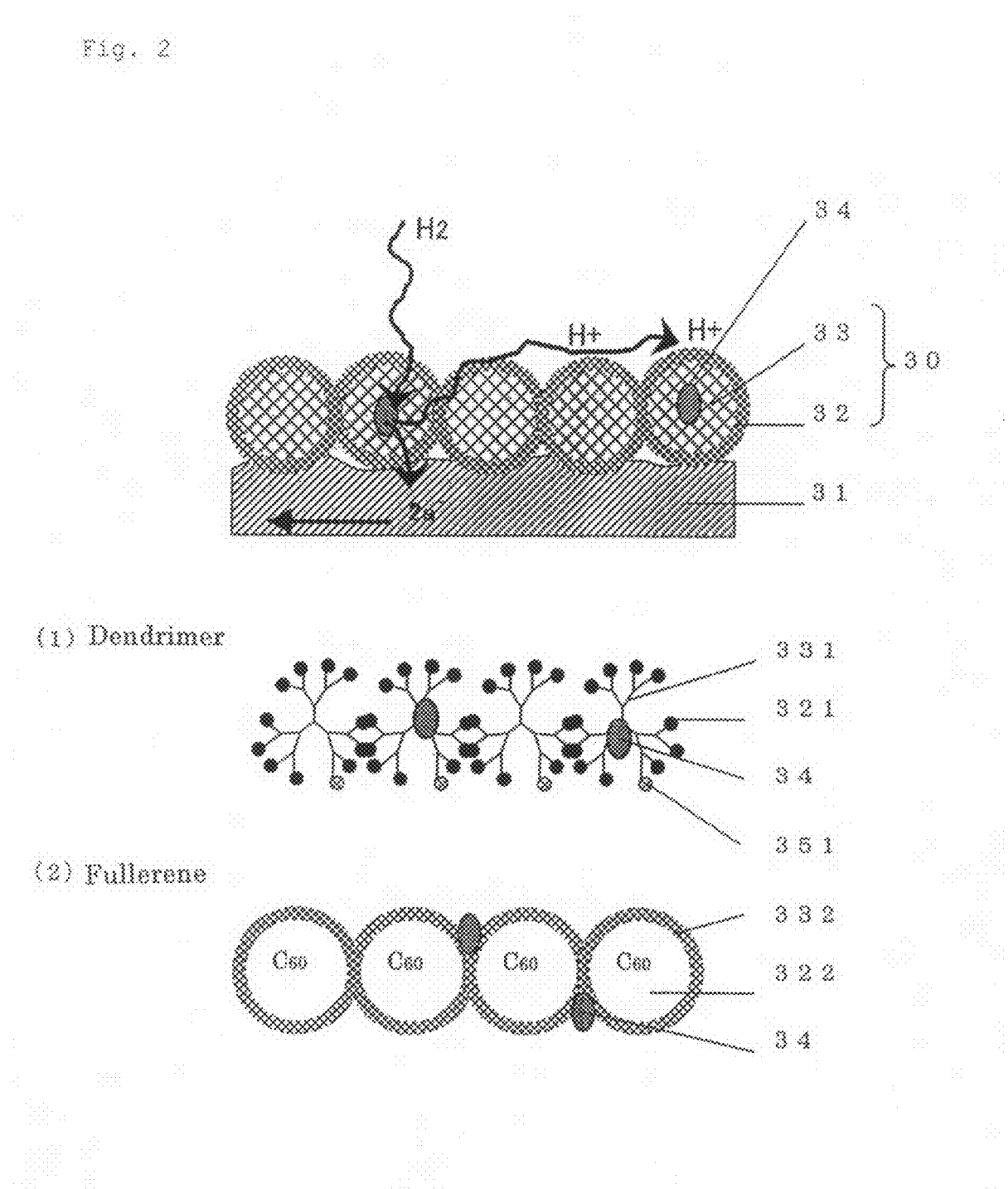
FIG. 2 is a diagram illustrating another example of the porous electrode of the present invention.

FIG. 2 (1) illustrates an example of a dendrimer of a spherical polymer. Here, sulfonic acid groups, hydroxyl groups, or other such proton affinity groups 321 are formed around the outside of the spacer 331 of a dendritic polymer. If some of these are groups 351 that have affinity to the porous material, then a proton affinity surface can be favorably formed on the porous material surface 31. The sphere diameter in this dendrimer can be controlled by growing one layer at a time from the center, so the particle size of the catalyst 34 fixed on the inside can be controlled by varying the size of the spheres. This makes it possible for the catalyst to have the optimal specific surface area. A dendrimer that supports a catalyst can be mixed with a dendrimer that does not support a catalyst, and the optimal amount of catalyst can be adjusted by varying the mixture amounts thereof. This results in an efficient electrode reaction.

FIG. 2 (2) illustrates an example of spherical carbon. The spacer component 322 of the spherical carbon is a skeleton of carbon 60, for example. The surface is composed of the proton affinity groups 332. Hydroxyl groups, sulfonic acid groups, or the like are imparted as the proton affinity groups. The catalyst 34 can be supported in the voids between the carbon 60 molecules. The catalyst is in a space formed by carbon 60 having a diameter of approximately 0.7 nm, so the structure allows for the catalyst particles to be smaller microparticles, affording a greater specific surface area. These features result in an efficient electrode reaction.

(3) EMBODIMENT 3

Figure 5:
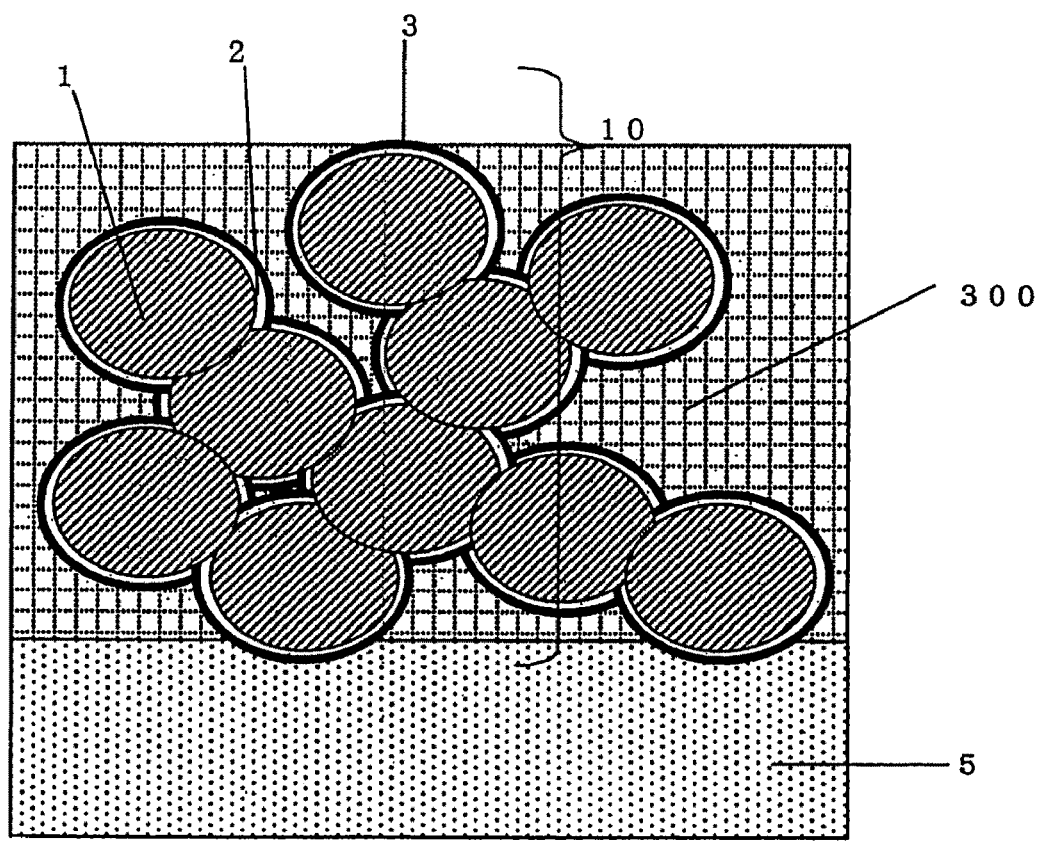
FIG. 5 is a diagram illustrating another example of the porous electrode of the present invention.

Another structure of the porous electrode of the present invention will be described through reference to FIG. 5.

When the porous electrode is used for an electrochemical element, the porous electrode 10 constituted as shown in Embodiment 1 or 2 is joined to the proton-conductive solid electrolyte 5. The empty space in the porous electrode 10 contributes to the electrode reaction with the catalyst through diffusion of fuel, and also conducts protons at the surface 3. If this space could handle both of the functions discussed above, there would be no need for voids in the porous material. Specifically, tiny voids are produced in a filler space 300 that fills with the spherical molecules having proton affinity groups on their surface. The hydrogen is able to diffuse into these voids, and therefore reaches the catalyst and undergoes an electrode reaction. Also, with this structure, the protons are moved not only at the surface 3, but also in the filler space 300, so there is less propagation resistance.

With this structure, the spacer 2 need not be formed in advance. In other words, when the spherical molecules are packed into the porous material 1, the spherical molecules are in close contact at the interface thereof, and the result is the same as when the surface of a monomolecular layer is formed. In this case, it may be necessary to use more catalyst than otherwise if the catalyst is packed into the spherical molecules first. Therefore, catalyst microparticles may be formed on the porous material in advance, and only then may the spherical molecules having a proton affinity surface be packed. This is effective in that it simplifies the process.

Specific examples of the porous electrode and the electrochemical element that makes use of the same pertaining to the present invention will be given below, but the scope of the present invention is not limited to or by these examples.

EXAMPLE 1

A porous material with a specific surface area of about 50 $m^2/g$ was obtained by compression molding of carbon black with an average particle size of 0.1 μm.

Meanwhile, the spherical molecules used as a spacer were prepared as follows. A polyamide-amine dendrimer (Generation 4) having hydroxyl groups on the surface (available from Aldrich) was added to methanol, and the resulting solution (0.1 mmol/L) was mixed with a platinum ammonium aqueous solution (3 mmol/L) so that the interior of the dendrimer was impregnated with the platinum ammonium. This product was then subjected to hydrogen reduction at 180° C., which formed platinum particles with an average size of 2 nm inside the dendrimer, and yielded a catalyst-supporting dendrimer. The catalyst-supporting dendrimer thus obtained was mixed with a polyamide-amine dendrimer (Generation 4.5) having carboxyl groups on the surface (available from Aldrich) in a molar ratio of 1:50, and water was added to the mixture. The diameter of the dendrimers used here was approximately 3 nm to 5 nm.

The above-mentioned porous material was immersed at room temperature in the above-mentioned mixture so that the dendrimers adsorbed to the porous material surface, which yielded a porous electrode A. The amount of catalyst supported here was approximately 0.1 $mg/cm^2$.

Next, the porous electrode A was applied to both sides of a fluoropolymer electrolyte film having sulfonic acid groups (trade name "Nafion," made by DuPont) to form an electrochemical element.

For the sake of comparison, a platinum ammonium aqueous solution was imparted to the same porous material as above, and this product was fired so that the platinum catalyst would be supported. The particle size of the catalyst was approximately 20 nm. The amount of catalyst supported was approximately 0.3 $mg/cm^2$. The porous material supporting this catalyst was coated with a perfluoropolymer having sulfonic acid groups to form a porous electrode B. This was combined with Nafion to create an electrochemical element.

A fuel cell was produced by introducing hydrogen to one side of each of these electrochemical elements, and introducing air to the opposite side. The output voltage of porous electrodes A and B was measured, and was found to be 0.8 V with the conventional porous electrode B, whereas the value was higher (0.9 V) with porous electrode A, which supported a smaller amount of catalyst. It can be seen from these results that the reaction is more efficient in the latter case.

EXAMPLE 2

A porous material was prepared by forming an electroless plating layer of gold in a thickness of approximately 20 nm on the surface of porous silica with an average pore diameter of 0.1 μm, a specific surface area of 200 m$^2$/g, and a density of 400 kg/m$^3$.

Meanwhile, a solution was prepared by dissolving a disulfide compound having a molecular structure of (S(CH2)15-COOH)2 to acetone such that its concentration would be 50 mmol/L. The catalyst-supporting dendrimer of Example 1 was then added to this solution so that the concentration would be the same as above. The porous material was immersed in this solution, which formed a monomolecular film on the surface of the porous material because the disulfide groups coordinate to the gold in self-organizing fashion. As a result, the surface of the obtained porous electrode was covered with carboxyl groups. Since the platinum (catalyst) particles here were present at the porous material surface, the dendrimer containing the catalyst was believed to have been incorporated into an organic layer composed of the —(CH2)15 portion of the monomolecular film of the disulfide compound. The platinum particles as the catalyst can be discerned by an electron microscope, but because the catalyst particles were contained within the dendrimer, they showed no sign of agglomerating together. The amount of catalyst supported here was approximately 0.1 mg/cm$^2$.

Just as in Example 1, this porous electrode was used in a fuel cell and the voltage was measured. The output was approximately 0.85 V, which confirmed that the reaction was proceeding efficiently.

EXAMPLE 3

The porous material in this case was a fired porous material, produced by compression molding titanium oxide particles with an average size of approximately 100 nm, and then firing this molded article.

Meanwhile, a solution was prepared by dissolving γ-(2-aminoethyl)aminopropylmethoxysilane (used as a silane coupling agent) in a concentration of 50 mmol/L in isopropyl alcohol. A platinum colloid with a particle size of 2 nm was dispersed in this solution. The porous titanium oxide was immersed in this dispersion to obtain a porous electrode on the surface of which was formed a monomolecular film comprising silyl groups chemically bonded to titanium oxide. Because the surface of the porous material was covered with amino groups, and the platinum colloid was present without agglomerating on the porous material surface, it was believed that this colloid catalyst had been incorporated into an organic layer of a monomolecular film. The amount of catalyst supported here was approximately 0.2 mg/cm$^2$.

The above porous electrode was joined to one side of an oxide proton conductor, $WO_3 \cdot xH_2O$ ($xH_2O$ is a hydrate or adsorbed water, where x is a value expressing the amount thereof), and a gold thin-film electrode was formed on the other side to produce an electrochemical element. A voltage of 0.5 V was applied to this element, and the current was measured. The current was proportional to the hydrogen concentration of the atmosphere. This confirmed that this electrochemical element was operating as a hydrogen concentration sensor.

EXAMPLE 4

A porous electrode C was obtained by filling in the spaces of the porous electrode A of Example 1 with a polyamide-amine dendrimer (Generation 4.5) having carboxyl groups on the surface.

This porous electrode C was used to obtain an electrochemical element in the same manner as in Example 1. Hydrogen was introduced to one side of the obtained electrochemical element, and air was introduced to the opposite side to create a fuel cell. The output voltage thereof was measured and found to be 0.9 V, confirming that the reaction was proceeding efficiently just as when the porous electrode A of the present invention in Example 1 was used.

EXAMPLE 5

A porous electrode D was obtained by packing a polyamide-amine dendrimer (Generation 4.5) having carboxyl groups on the surface into the spaces of the porous electrode B of Example 1.

This porous electrode D was used to obtain an electrochemical element in the same manner as in Example 1. Hydrogen was introduced to one side of this electrochemical element, and air was introduced to the opposite side to create a fuel cell. The output voltage thereof was measured and found to be 0.85 V, confirming that the reaction was proceeding more efficiently than when the conventional porous electrode B in Example 1 was used.

EXAMPLE 6

Just as in Example 1, porous carbon with a specific surface area of approximately 50 m$^2$/g was obtained by compression molding carbon black with an average particle size of 0.1 μm.

The spherical molecules were polyhydroxylated carbon 60 (hydroxylated fullerene), in which the number of carbons was 60 and hydroxyl groups were formed on the surface. This hydroxylated fullerene was added to tetrahydrofuran, and the porous carbon was immersed in the resulting solution at room temperature.

This produced porous carbon in which hydroxylated fullerene was adsorbed as a spacer to the porous material surface. This porous material was immersed in a platinum ammonium aqueous solution to support the platinum ammonium, and hydrogen reduction was performed at 180° C. to form platinum microparticles with an average size of approximately 2 nm and obtain a porous electrode. This was observed under an electron microscope, and since the platinum microparticles were not agglomerated, it was believed that they were formed in the voids between adjoining molecules. The amount of catalyst supported here was approximately 0.2 mg/cm$^2$.

After this, an electrochemical element was formed by applying the above-mentioned porous electrodes to both sides of Nafion, a fluoropolymer electrolyte film having sulfonic acid groups. Hydrogen was introduced to one side of this electrochemical element, and air was introduced to the opposite side to create a fuel cell. The output of this fuel cell was 0.9 V, or about the same as that of porous electrode A in Example 1, confirming that the reaction proceeded efficiently.

The invention claimed is:

1. A porous electrode comprising a porous material having electron conductivity, wherein (1) the porous material comprises a three-dimensional skeleton, (2) a substance having one or more proton affinity groups is present on all or part of the three-dimensional skeleton surface, wherein the substance is a dendrimer having one or more proton affinity groups on the surface, wherein, said dendrimer is based on a polyamide-amine, polypropylene-imine, polyether, aliphatic polymer or aromatic polymer and (3) a catalyst for separating hydrogen into protons and electrons is supported on the inside of the dendrimer.

2. The porous electrode according to claim 1, wherein the porous material is a carbon material.

3. The porous electrode according to claim 1, obtained by impregnating a porous material with a solution or dispersion containing a substance that has one or more proton affinity groups.

4. The porous electrode according to claim 1, wherein the porosity of the porous material is at least 20% and not more than 80%.

5. The porous electrode according to claim 1, wherein the specific surface area of the porous material is at least 10 $m^2/g$ and not more than 500 $m^2/g$.

6. A method for manufacturing a porous electrode comprising a porous material having electron conductivity, wherein (1) the porous material comprises a three-dimensional skeleton, (2) a substance having one or more proton affinity groups is present on all or part of the three-dimensional skeleton surface, wherein the substance is a dendrimer having one or more proton affinity groups on the surface, wherein, said dendrimer is based on a polyamide-amine, polypropylene-imine, polyether, aliphatic polymer or aromatic polymer and (3) a catalyst for separating hydrogen into protons and electrons is supported on the inside of the dendrimer, comprising a step of impregnating the porous material with a solution or dispersion containing said substance which supports said catalyst.

7. An electrochemical element comprises a fuel electrode that produces protons from a fuel and an oxygen electrode that reacts protons with oxygen, wherein the fuel electrode and the oxygen electrode are disposed across from each other with a proton-conductive solid electrolyte in between, and wherein at least one of the electrodes is the porous electrode according to claim 1.

8. The electrochemical element according to claim 7, wherein the fuel is hydrogen.

9. The electrochemical element according to claim 8, wherein the fuel is methanol.

10. The porous electrode according to claim 1, wherein the dendrimer has one or more porous material affinity groups on the surface.

11. The method for manufacturing a porous electrode according to claim 6, wherein the dendrimer has one or more porous material affinity groups on the surface.

12. The electrochemical element according to claim 7, wherein the dendrimer has one or more porous material affinity groups on the surface.

13. The porous electrode according to claim 1, wherein the porous electrode comprise a dendrimer that does not support the catalyst.

14. The method for manufacturing a porous electrode according to claim 6, wherein the porous electrode comprise a dendrimer that does not support the catalyst.

15. The electrochemical element according to claim 7, wherein the porous electrode comprise a dendrimer that does not support the catalyst.

* * * * *

UNITED STATES PATENT AND TRADEMARK OFFICE
CERTIFICATE OF CORRECTION

| | | |
|---|---|---|
| PATENT NO. | : 7,662,505 B2 | Page 1 of 1 |
| APPLICATION NO. | : 10/879759 | |
| DATED | : February 16, 2010 | |
| INVENTOR(S) | : Masa-aki Suzuki | |

It is certified that error appears in the above-identified patent and that said Letters Patent is hereby corrected as shown below:

ON THE TITLE PAGE:

In Item "(56) References Cited", below the data listed under "FOREIGN PATENT DOCUMENTS" and before the Examiner Information, delete the following:

"JP 7-484859 A 2/1995", "JP 2002-11075 A 4/2002", "JP 2003-282078 10/2003", "JP 2004-6266 1/2004", and "WO WO02/13295 A 2/2002"

Signed and Sealed this

Second Day of November, 2010

David J. Kappos
*Director of the United States Patent and Trademark Office*